US007442724B2

(12) United States Patent
Esselborn et al.

(10) Patent No.: US 7,442,724 B2
(45) Date of Patent: Oct. 28, 2008

(54) DISPERSANTS FOR PREPARING AQUEOUS PIGMENT PASTES

(75) Inventors: Jutta Esselborn, Essen (DE); Philippe Favresse, Alzenau (DE); Kathrin Lehmann, Leverkusen (DE); Ute Linke, Hattingen (DE); Angela Rüttgerodt, Köln (DE); Stefan Silber, Krefeld (DE)

(73) Assignee: Goldschmidt GmbH, Essen (DE)

( * ) Notice: Subject to any disclaimer, the term of this patent is extended or adjusted under 35 U.S.C. 154(b) by 632 days.

(21) Appl. No.: 10/968,699

(22) Filed: Oct. 19, 2004

(65) Prior Publication Data

US 2005/0085563 A1    Apr. 21, 2005

(30) Foreign Application Priority Data

Oct. 21, 2003  (DE) ............................... 103 48 825

(51) Int. Cl.
| | |
|---|---|
| *A61K 9/16* | (2006.01) |
| *B60C 1/00* | (2006.01) |
| *C08F 18/00* | (2006.01) |
| *C08F 20/10* | (2006.01) |
| *C08F 30/02* | (2006.01) |
| *C08F 116/12* | (2006.01) |
| *C08F 118/02* | (2006.01) |
| *C08F 212/00* | (2006.01) |
| *C08F 216/02* | (2006.01) |
| *C08F 290/06* | (2006.01) |
| *C08G 63/48* | (2006.01) |
| *C08J 3/00* | (2006.01) |
| *C08K 3/04* | (2006.01) |
| *C08L 31/00* | (2006.01) |
| *C08L 33/00* | (2006.01) |
| *C09D 5/00* | (2006.01) |
| *C09D 5/02* | (2006.01) |
| *C09D 11/00* | (2006.01) |

(52) U.S. Cl. .................. 523/160; 523/161; 524/495; 524/496; 524/543; 524/556; 524/558; 525/69; 526/278; 526/307.5; 526/319; 526/320; 526/329.6; 526/332; 526/333; 526/334

(58) Field of Classification Search ................ 523/160, 523/161; 524/495, 496, 543, 556, 558; 525/69; 526/278, 307.5, 319, 320, 328, 328.5, 329.6, 526/332, 333, 334
See application file for complete search history.

(56) References Cited

U.S. PATENT DOCUMENTS

| | | | |
|---|---|---|---|
| 3,980,602 A | 9/1976 | Jakubauskas | |
| 6,235,813 B1 * | 5/2001 | Brandt et al. | ................ 523/436 |

FOREIGN PATENT DOCUMENTS

| | | |
|---|---|---|
| DE | 199 04 603 A1 | 8/2000 |
| EP | 0 731 148 A2 | 9/1996 |
| WO | WO 94/21701 | 9/1994 |
| WO | WO 96/14347 | 5/1996 |
| WO | WO 97/19948 | 6/1997 |

* cited by examiner

*Primary Examiner*—Patrick D Niland
(74) *Attorney, Agent, or Firm*—Frommer Lawrence & Haug LLP

(57) ABSTRACT

The invention relates to the use of copolymers with styrene-oxide-based, vinyl-functionalized polyethers for preparing aqueous pigment preparations.

24 Claims, No Drawings

DISPERSANTS FOR PREPARING AQUEOUS PIGMENT PASTES

RELATED APPLICATIONS

This application claims priority to German application Ser. No. 103 48 825.1, filed Oct. 21, 2003, herein incorporated by reference.

BACKGROUND OF THE INVENTION

1. Field of the Invention

The invention relates to the use of copolymers with vinyl-functionalized and styrene-oxide-based polyethers for preparing aqueous pigment preparations.

2. Discussion of the Art

In order to facilitate and to improve the dispersion of solids in liquid media it is common to use dispersants, which as surface-active agents promote wetting of the particulate solids to be dispersed, and aid in the disruption of agglomerates. These dispersants also have a stabilizing effect on the resultant dispersions and prevent reagglomeration or flocculation of the particulate solids. Dispersants are particularly important, for example, for dispersing pigments in the preparation of printing inks, paints and other coating materials.

In the preparation of inks and paints, wetting agents and dispersants facilitate the incorporation of pigments and fillers, which are important formulating constituents that significantly determine the visual appearance and the physicochemical properties of coatings. Optimum use requires firstly that these solids are distributed uniformly in paints and inks, and secondly that the state of distribution, once attained, is stabilized. Numerous problems may occur during the preparation and processing of aqueous pigment pastes and their subsequent use in formulating paints and inks:

high color paste, ink and paint viscosities
sedimentation
vertical separation of pigments (flooding)
horizontal separation of pigments (floating)
low degree of gloss
low hiding power
inadequate transparency
inadequate color strength
poor shade reproducibility, shade shift
excessive tendency of coating materials to run There has therefore been no lack of attempts to provide effective dispersing additives for solids, especially pigments. For example, water-soluble polyisocyanate adducts containing hydrophilic polyether chains (EP-A-0 731 148), acid poly(meth)acrylates (U.S. Pat. No. 3,980,602; WO-A-94/21701), phosphate esters of polyalkylene oxide block polyesters (WO-A-97/19948), amine oxides (DE-A-199 04 603) or alternating copolymers of vinyl monomers and dicarboxylic diesters (especially copolymers based on maleic acid derivatives and vinyl monomers) are described for this purpose (WO-A-96/14347, EP-A-0 791 024).

However, the use of such products is also associated with a multiplicity of disadvantages. Frequently, for instance, large amounts of dispersing additives are required; the levels of paste pigmentation that can be achieved are unsatisfactorily low; or the stability of the pastes and hence the consistency of their viscosity is inadequate. Flocculation and aggregation cannot always be avoided. The dispersion of hydrophobic organic pigments, in particular, causes problems in numerous instances. There is often a lack of consistency of shade following storage of the pastes, and a lack of compatibility with a variety of binders. In many cases, the use of known dispersing additives also has an adverse effect on the water resistance or light stability of coatings and, moreover, provides additional stabilization of the unwanted foam which is formed in the course of the preparation and processing. Furthermore, owing to deficiencies in the compatibility of the dispersing additives in numerous letdown binders, there is often an undesirable impairment—that is, lowering—of the gloss.

OBJECTS OF THE INVENTION

It is therefore an object of the present invention to overcome a multiplicity of the aforementioned disadvantages for the dispersing of pigments, an aim being, in particular, to exert a positive influence on the storage stability of the pigment concentrates in respect of rheological behavior, flocculation, aggregation and shade shift through hydrolysis resistance of the active substances used, and also on the weather resistance and yellowing stability of coatings produced from them; furthermore, the use of the dispersing additives should not introduce any volatile organic components into the formulations.

A further objective, which has very largely not been achieved to date, is to prepare binder-free and cosolvent-free or VOC-free organic and inorganic pigment concentrates with polymeric wetting and dispersing additives (i.e. avoiding surface-active substances such as alkylphenol alkoxylates having critical ecotoxicological profiles) while achieving high pigment contents.

These objects and others, which are apparent from the Description of the Invention, are achieved, surprisingly, through the use of copolymers with unsaturated carboxylic acid—preferably dicarboxylic acid—derivatives and polymerizable, styrene-oxide-based oxyalkylene glycol polyethers or polyalkylene oxide polyethers.

DESCRIPTION OF THE INVENTION

Accordingly a first embodiment of the present invention consists in the use of copolymers based on styrene-oxide-based oxyalkylene glycol alkenyl ethers or polyalkylene oxide alkenyl ethers and unsaturated carboxylic acid—preferably dicarboxylic acid—derivatives as dispersing additives in paints and printing inks or for preparing aqueous pigment concentrates, composed of:

A) from about 1 to about 80 mol % of at least one of the structural groups of the formula Ia, Ib, Ic and/or Id

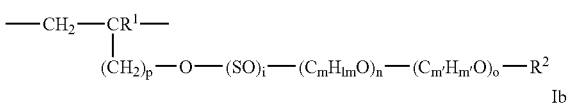

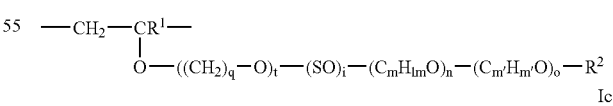

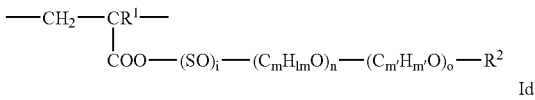

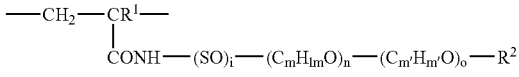

in which
R$^1$=H, aliphatic hydrocarbon radical preferably having 1 to 5 carbon atoms,
p=1 to 4,
q=0 to 6,
t=0 to 4,
i=1 to 6,
l=2 or is 1 in the situation where $(C_mH_{lm}O)_n$ or $(C_mH_{lm}O)_o$ is SO,
m=2 to 18,
m'=2 to 18 the index on the H atom being formed by the product of l and m,
n=0 to 100,
o=0 to 100, preferably the sum of (n+0)>0,
SO=styrene oxide where
(SO)$_1$ and the alkylene oxide derivatives can be distributed randomly or blockwise in the polyether, but preferably the groups are of blockwise construction and are present in the order —(SO)$_i$—[$(C_mH_{lm}O)_n$—$(C_mH_{lm}O)_o$]—R$^2$.
R$^2$=H, an aliphatic, linear or branched hydrocarbon radical preferably having 1 to 20 carbon atoms, a cycloaliphatic hydrocarbon having 5 to 8 carbon atoms, an aryl radical having 6 to 14 carbon atoms, which is unsubstituted or substituted, or can be a phosphoric ester derivative (preferably monoester), sulfate derivative or sulfonate derivative.

B) from about 1 to about 90 mol % of structural groups of the formula II

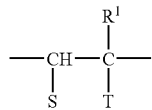

where
S=—H, —COOM$_a$, —COOR$^3$, where
M=hydrogen, monovalent or divalent metal cation, ammonium ion, organic amine radical,
a=1 or, if M is a divalent metal cation, is ½,
R$^3$=an aliphatic, linear or branched hydrocarbon radical having 1 to 20 carbon atoms, a cycloaliphatic hydrocarbon having 5 to 8 carbon atoms, an aryl radical having 6 to 14 carbon atoms,
T=—U$^1$—R$^4$ or —U$^1$—$(C_mH_{lm}O)_n$—$(C_mH_{lm}O)_o$—R$^2$,
U$^1$=—COO—, —CONH—, —CONR$^3$—, —O—, —CH$_2$O—,
R$^4$=H, M$_a$, R$^3$ or —Q$^1$—NQ$^2$Q$^3$, where
Q$^1$ is a divalent alkylene radical having 2 to 24 carbon atoms,
Q$^2$ and Q$^3$—are aliphatic and/or alicyclic alkyl radicals, preferably having 1 to 12 carbon atoms, optionally oxidized to —Q$^1$—N$^{(+)}$O$^{(-)}$Q$^2$Q$^3$ and
m, n, l, o, R$^1$ and R$^2$ are as defined above.

C) from 0 to about 10 mol % of structural groups of the formula III

where
T$^1$=—U$^1$—$(C_mH_{lm}O)_n$—$(C_{m'}H_{lm'}O)_o$—R$^5$,

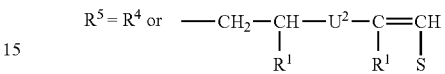

where
U$^2$=—OOC—, —NHOC—, —O—, —O—CH$_2$—, where
m, m', n, l, o, S, R$^1$, R$^2$ and U$^1$ are as defined above.

The copolymer compounds corresponding to the present invention are composed of at least two of the three structural groups A), B) and C). The first structural group A) corresponds to the formula Ia, Ib, Ic and/or Id

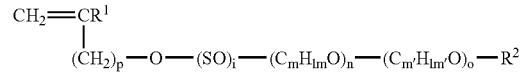

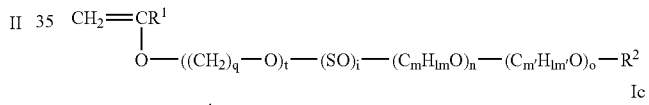

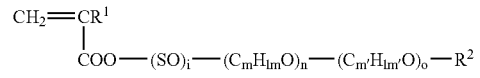

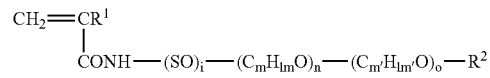

which derive from the polymerizable, styrene-oxide-based oxyalkene glycol polyethers or polyalkylene oxide polyethers and in which
R$^1$ is hydrogen, an aliphatic hydrocarbon radical, preferably having 1 to 5 carbon atoms (which may likewise be linear or branched and/or else may be unsaturated) and
R$^2$ is hydrogen, an aliphatic hydrocarbon radical, preferably having 1 to 20 carbon atoms (which may likewise be linear or branched and/or else may be unsaturated) or a phosphate derivative, but preferably hydrogen monoester phosphate, sulfate derivative or sulfonate derivative.
p can adopt values between 1 and 4 and it is possible that
q=0 to 6,
t=0 to 4,
i=1 to 6,
l=1 or 2,
m=2 to 18,
n=0 to 100,
o=0 to 100.

Preferred cycloalkyl radicals are regarded as being cyclopentyl or cyclohexyl radicals, and preferred aryl radicals are regarded as being phenyl or naphthyl radicals, which in particular may be substituted. additionally by hydroxyl, carboxyl or sulfonic acid groups.

In accordance with one preferred embodiment in formula Ib t=0, i=3,l=2, m =2, n=20, o=0 and $R^1$=H, so that the structural group in question derives from polystyrene oxide, polyethylene oxide vinyl ether.

It is possible for $(SO)_i$ and the alkylene oxide derivatives to be distributed randomly or blockwise in the polyether, but preferably the groups are of blockwise construction and are present in the order $—(SO)_i—[(C_mH_{lm}O)_n—(C_mH_{lm'}O)_o]—R^2$.

The second structural group B) corresponds to the formula II

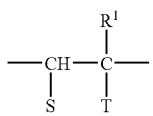

II

In formula II $R^1$ can be =H or $CH_3$, depending on whether the derivatives in question are acrylic or methacrylic acid derivatives. S in this case can be —H, $COOM_a$ or —$COOR^3$, where M=hydrogen, a monovalent or divalent metal cation, ammonium ion, an organic amine radical with a=1, or, if M is a divalent cation, a=½. The result in that case, together with a further moiety likewise containing $M_a$ (with a=½), is a bridge via M.

As monovalent or divalent metal cation use is made preferably of sodium, potassium, calcium or magnesium ions.

As organic amine radicals it is preferred to use substituted ammonium groups which derive from primary, secondary or tertiary $C_1$-$C_{20}$ alkylamines, $C_1$-$C_{20}$ alkanolamines, $C_5$-$C_8$ cycloalkylamines and $C_6$-$C_4$ arylamines. Examples of corresponding amines are methylamine, dimethylamine, trimethylamine, ethanolamine, diethanolamine, triethanolamine, cyclohexylamine, dicyclohexylamine, phenylamine, diphenylamine in the protonated (ammonium) form, dimethylaminoethanol, 2-amino-2-methyl-1-propanol.

$R^3$ is an aliphatic hydrocarbon radical having 1 to 20 carbon atoms, preferably having 1 to 6 carbon atoms, a cycloaliphatic hydrocarbon radical having 5 to 8 carbon atoms or an aryl radical having 6 to 14 carbon atoms, which radical may if desired be additionally substituted. The aliphatic hydrocarbon radical may likewise be linear or branched. The preferred cycloaliphatic hydrocarbon radicals are, in turn, cyclopentyl or cyclohexyl radicals and the preferred aryl radicals are phenyl or naphthyl radicals, which in particular may also be substituted by hydroxyl, carboxyl or sulfonic acid groups. If T=—$COOR^3$ the S=$COOM_a$ or —$COOR^3$. If T and S=$COOR^3$ the corresponding structural groups derive from the dicarboxylic esters.

Besides these ester structural units the structural groups B) may also possess other hydrophobic structural elements. These include the polyalkylene oxide derivatives with:

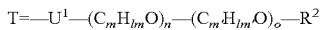

where
l=2 or 1 in the situation where $(C_mH_{lm}O)_n$ or $(C_mH_{lm'O})_m$ is SO,
m=2 to 18,
m'=2 to 18,
n=0 to 100,
o=0 to 100, preferably with the sum of(n+o)>0.

The polyalkylene oxide derivatives can in this case be linked via a moiety $U^1$ to the ethyl radical of the structural group B) corresponding to formula II, where it is possible that $U^1$=—COO—, —CONH—, —$CONR^3$—, —O— or —$CH_2$—O—. In this case the entities in question are the corresponding (meth)acrylates, amide ethers, vinyl ethers or alkyl ethers of the structural groups corresponding to formula II.

As carboxylic acid or dicarboxylic acid derivatives corresponding to the formula II it is also possible to use reaction products with diamines from the group $-Q^1-NQ^2Q^3$, where $Q^1$ is a divalent alkylene radical having 2 to 24 carbon atoms, $Q^2$ and $Q^3$ are identical or different, aliphatic and/or alicyclic alkyl radicals having 1 to 12 carbon atoms, these reaction products having been oxidized to form amine oxide groups attached via monoamide groups or imide groups.

The third structural group C) corresponds to the formula III

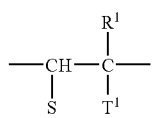

III

In the formula III $R^1$ can be =H or $CH_3$, depending on whether the derivatives in question are acrylic or meth acylic acid derivatives. S here can be —H, $COOM_a$ or —$COOR^3$, it being possible for a and M to possess the definition mentioned above and for $R^3$ to be an aliphatic hydrocarbon radical having 1 to 20 carbon atoms, a cycloaliphatic hydrocarbon radical having 5 to 8 carbon atoms or an aryl radical having 6 to 14 carbon atoms. The aliphatic hydrocarbon radical may likewise be linear or branched, saturated or unsaturated. The preferred cycloaliphatic hydrocarbon radicals in tun cyclopentyl or cyclohexyl radicals and the preferred aryl radicals are phenyl or naphthyl radicals. If $T^1$=—$COOR^3$ then S=—$COOM_a$ or —$COOR^3$. If $T^1$ and S are =—$COOR^3$ then the corresponding structural groups derive from the dicarboxylic esters.

Besides these ester structural units it is possible for the structural groups C) to possess other hydrophobic structural elements as well. These include the polyalkylene oxide derivatives with:

$T^1$=—$U^1$—$(C_mH_{lm}O)_n$—$(C_mH_{lm'}O)_o$—$R^5$ where
l=2 or is 1 in the situation where $(C_mH_{lm}O)_n$ or $(C_mH_{lm'}O)_o$ is SO,
m=2 to 18,
m'=2 to 18,
n=0 to 100,
o=0 to 100, preferably with the sum of (n+o)>0.

The polyalkylene oxide derivatives can in this case be linked via a moiety $U^1$ to the ethyl radical of the structural group C) corresponding to formula m, it being possible that $U^1$=—COO—, —CONH—, —$CONR^3$—, —O— or —$CH_2$—O—. In this case the entities in question are the corresponding (meth)acrylates, amide ethers, vinyl ethers or allyl ethers of the structural groups corresponding to formula III.

$R^5$ can here in turn be

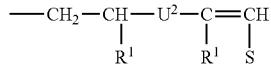

where
$U^2$ can be —OOC—, —NHOC—, —O— or —OCH$_2$— and S possesses the definition described above. These compounds represent polyalkylene oxide derivatives of the bifunctional alkenyl compounds corresponding to formula III Particular preference for the purposes of the present invention is given to the use for preparing aqueous or cosolvent-containing pigment concentrates, the copolymers being used in amounts of from about 0.1 to about 200% by weight, in particular up to 100% by weight, based on the pigment It is preferred in accordance with the invention if the copolymers are composed of from about 1 to about 80 mol % of structural groups of the formula Ia, Ib, Ic and/or Id, from about 1 to about 90 mol % of structural groups of the formula II and from 0 to about 10 mol % of structure groups of formula III. With particular preference the copolymers are composed of from about 10 to about 60 mol % of structural groups of the formula Ia, Ib, Ic and/or Id, from about 40 to about 90 mol % of structure groups of the formula II and from 0 to about 2 mol % of structural groups of the formula III. In accordance with one preferred embodiment the copolymers of the invention further contain up to about 50 mol %, in particular up to about 20 mol %, based on the sum of the structural groups A), B) and C), of structural groups whose monomer represents a vinyl, acrylic acid or methacrylic acid derivative.

The monomeric vinyl derivatives preferably derive from a compound selected from the group consisting of styrene, ethylene, propylene, isobutene and vinyl acetate. As preferred monomeric acrylic acid derivative the additional structural groups derive in particular from acrylic acid, methyl acrylate or butyl acrylate. Methacrylic acid, methyl methacrylate, butyl methacrylate and hydroxyethyl methacrylate are to be regarded as a preferred monomeric methacrylic acid derivative.

A particular advantage of the copolymers used in accordance with the invention is that the molar fractions of the structural units A) to C) can be adjusted so as to give a balanced ratio of polar to a polar moieties in the corresponding copolymers, thereby permitting targeted control of the surface-active properties of the corresponding products.

There is no restriction on the number of repeating structural elements, although it has proven particularly advantageous to adjust the number of structural elements such that the copolymers have an average molecular mass of from about 150 to about 2 000 000, the desired molecular mass being guided primarily by the field of use.

Normally the polymers in the lower molar mass range have values of from about 1000 to about 5000 and in the upper molar mass range values of from about 20 000 to about 50 000.

The first component according to the invention for preparing the copolymers of the invention represents a polymerizable, styrene-oxide-based oxyalkylene glycol ether or polyalkylene oxide ether, which is used in an amount of from about 1 to about 80 mol %, preferably from about 10 to about 60 mol %. In the case of the preferred polymerizable, styrene-oxide-based oxyalkylene glycol ethers or polyalkylene oxide ethers corresponding to the formulae Ia, Ib, Ic and/or Id

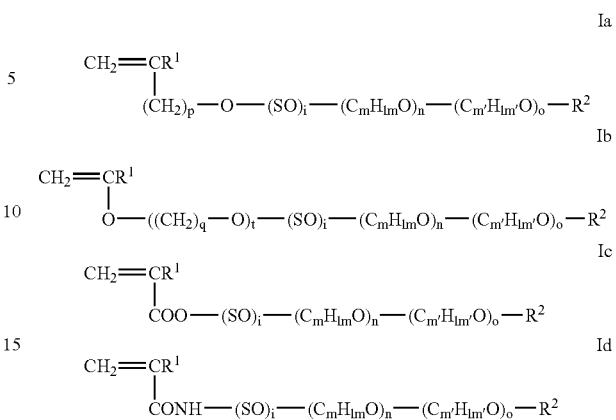

$R^1$ is hydrogen or an aliphatic hydrocarbon radical having 1 to 5 carbon atoms (which may likewise be linear or branched and/or else unsaturated), p can adopt values between 1 and 4, q is 0 to 6, t is 0 to 4 where $R^2$ is H, an aliphatic hydrocarbon radical having 1 to 20 carbon atoms (linear or branched and also saturated or else at , preferably 1 to 6 carbon atoms, a cycloaliphatic hydrocarbon having 5 to 8 carbon atoms, an aryl radical having 6 to 14 carbon atoms, which may if desired be substituted or may be a phosphoric ester derivative, preferably a monophosphate ester, sulfate derivative or sulfonate derivative, i=1 to 6, l=2 or 1 in the situation where $(CH_mH_{lm}O)_n$ or $(C_mH_{lm'})_o$ is SO, m=2 to 18, m'=2 to 18, n 0 to 100, o=0 to 100.

According to one preferred embodiment in formula Ib:

t=0, i=3, l=2, m=2, m'=2 n=20, o=0, so that the structural groups m question derive from polystyrene oxide and polyethylene oxide vinyl ether.

It is possible for $(SO)_i$ and the alkylene oxide derivatives to be distributed randomly or blockwise in the polyether, but preferably the groups are of blockwise construction and are present in the order —$(SO)_i$—[$(C_mH_{lm}O)_n$—$(C_mH_{lm}O)_o$]—$R^2$.

As a second component essential to the invention for introducing the structural groups B) it is preferred to use from about 40 to about 90 mol % of a vinylic polyalkylene glycol compound, polyalkylene oxide compound. As vinylic polyalkylene glycol compound or polyalkylene oxide compound use is made of derivatives corresponding to the formula IV

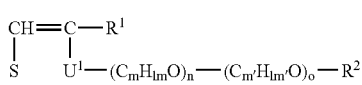  (IV)

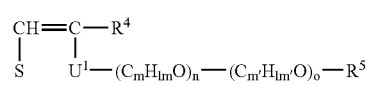  (V)

where
it is possible that
S=preferably —H or —COOM$_a$ and U$^1$=—COO—, —CONH—, —CONR$^3$—, —O— or —CH$_2$O—, i.e., the entities in question are the (meth)acrylic acid, acid amide ethers, vinyl ethers or allyl ethers of the corresponding polyalkylene glycol derivatives or polyalkylene oxide derivatives. The values are for
l=2 or is 1 in the situation where $(C_mH_{lm}O)_n$ or $(C_mH_{lm'}O)_o$ is SO,
m=2 to 18,
m'=2 to 11,
n=0 to 100,
o=0 to 100, preferably with the sume of(n+o)>0.

With R$^1$ the entities in question are the polyalkylene glycol monoamides or polyalkylene oxide monoamides and/or ethers of the corresponding acrylic (S=H, R$^1$=H), methacrylic (S=H, R$^1$=CH$_3$) or maleic (S=COOM$_a$, R$^1$=H) acid derivatives, acrylates, methacrylates and acrylamides. Examples of such monomers are N-(methylpolypropylene glycol)maleimide, N-(methoxypolypropylene glycol-polyethylene glycol)maleimide, polypropylene glycol vinyl ether and polypropylene glycol allyl ether, methyl acrylate, butyl acrylate, methyl methacrylate, butyl methacrylate, acrylamide and dimethylpropylacrylamide.

As unsaturated carboxylic acid derivatives, in accordance with formula II, it is preferred to use maleic acid, maleic monoesters, maleic monoamides, maleic ureides or reaction products with diamines, which if desired have been oxidized to derivatives containing amine oxide groups, but also fumaric acid. Preference is given to using copolymers based on maleic monoesters, maleic monoamides and maleic ureides.

Instead of maleic acid or fumaric acid it is also possible to use their monovalent or divalent metal salts, preferably sodium, potassium, calcium or magnesium salts, their ammonium salts or their salts with an organic amine radical.

As maleic monoesters use is made in particular of an ester derivative whose alcoholic component is a polyalkylene glycol derivative or polyalkylene oxide derivative of the general formula HO—R$^1$ or HO—(C$_m$H$_{lm}$O)$_n$—(C$_m$H$_{lm}$O)$_o$—R$^2$. R$^1$, l, m, n and o possess the definition specified above.

The preferred substitutions on the aryl radical are hydroxyl, carboxyl or sulfonic acid groups. In the case of the maleic or fumaric monoamides the radicals R$^2$ of the moiety —NR$^2$$_2$ are identical to R$^1$. The unsaturated dicarboxylic acid derivatives are preferably used in an amount of from 10 to 60 mol %.

A third component to the invention for introducing the structural groups C) is preferably from 0 to about 2 mol % of a vinylic polyalkylene glycol, polyalkylene oxide or ester compound. As a preferred vinylic polyalkylene glycol compound or polyalkylene oxide compound use is made of derivatives corresponding to the formula V where
is possible that
S=preferably —H or —COOM$_a$ and
U$^1$=—COO—, —CONH—, —CONR$^3$—, —O— or —CH$_2$O—, i.e., the entities in question are the (meth) acrylic acid ethers, acid amide ethers, vinyl ethers or allyl ethers of the corresponding polyalkylene glycol derivatives or polyalkylene oxide derivatives. The values are for
l=2 or is 1 in the situation where $(C_mH_{lm}O)_n$—$(C_mH_{lm'})_n$ is SO,
m=2 to 18,
m'=2 to 18,
n=0 to 100,
o=0 to 100, preferably where the sum of (n+o)>0.
R$^5$ denotes

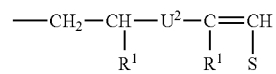

where
U$^2$=—COO—, —NH—CO—, —O— and —OCH$_2$— and S=-COOM$_a$ and preferably —H.

R$^5$ stands for bifunctional vinyl compounds whose polyalkylene glycol derivatives or polyalkylene oxide derivatives are connected to one another via amide groups or ether groups (—O— or —OCH$_2$—, respectively). Examples of such compounds are polypropylene glycol bismaleamic acid, polypropylene glycol diacrylamide, polypropylene glycol dimethacrylamide, polypropylene glycol divinyl ether, polypropylene glycol diallyl ether.

The molecular masses of the compounds which form the structural group Id) can be varied within wide limits and are preferably between 150 and 20 000.

The aqueous formulations of the copolymers used in accordance with the invention, because of the alternation of hydrophilic or hydrophobic groups in the macromolecular structure, have a cloud point which The molecular masses of the compounds which form the structural group Id) can be varied within wide limits and are preferably between 150 and 20 000.

The aqueous formulations of the copolymers used in accordance with the invention, because of the alternation of hydrophilic or hydrophobic groups in the macromolecular structure, have a cloud point which is preferably between 20 and 98° C. and preferably can be controlled arbitrarily by the fraction of the structural element C).

The copolymers used in accordance with the invention can be prepared in a variety of ways. It is preferred to polymerize from about 10 to about 60 mol % of an oxyalkylene glycol alkylene ether or polyalkylene oxide alkenyl ether, from about 40 to about 90 mol % of an unsaturated dicarboxylic acid derivative, vinyl, acrylic acid or methacrylic acid derivative and from 0 to 2 mol % of a vinylic polyalkylene glycol compound or polyalkylene oxide compound, with the aid of a free-radical initiator.

In accordance with one preferred embodiment additionally up to 50 mol %, in particular up to 20 mol %, based on the monomers with the structural groups according to the formulae I, II, and III, of a vinyl, acrylic acid or methacrylic acid derivative is incorporated by copolymerization. A preferred monomeric vinyl derivative used is styrene, ethylene, propylene, isobutene or vinyl acetate; a preferred monomeric acrylic acid derivative used is acrylic acid, methyl acrylate or butyl acrylate, while as monomeric methacrylic acid derivatives, finally, it is preferred to employ methacrylic acid, methyl methacrylate, butyl methacrylate and hydroxyethyl methacrylate.

The stated copolymers can be prepared by means of processes which are state of the art. One particular advantage is that it is possible preferably to operate without solvents or else in aqueous solution. In both cases the reactions involved are at atmospheric pressure and are therefore unobjectionable from the standpoint of safety.

If the process is conducted in aqueous solution, the polymerization takes place at from about 20 to about 100° C. with the aid of a customary free-radical initiator, the concentration of the aqueous solution being adjusted preferably to from about 30 to about 60% by weight According to one preferred embodiment the free-radical polymerization may in this case be conducted within the acidic pH range, in particular at a pH of between 4.0 and 6.5, it being possible to make use of the conventional initiators such as $H_2O_2$ without the risk of ether cleavage, which would be very detrimental to the yield.

In the process it is preferred to operate by introducing the unsaturated dicarboxylic acid derivative in partially neutralized form in aqueous solution, preferably together with the polymerization initiator, and to meter the remaining monomers into this initial charge as soon as the required reaction temperature has been reached in the initial charge.

Added separately are the polymerization auxiliaries, which are able to lower the activation threshold of the preferably peroxidic initiator so that the copolymerization can proceed at relatively low temperatures. According to another preferred version it is possible for not only the unsaturated dicarboxylic acid derivative but also the free-radical initiator to be metered into the initial reactor charge in separate or joint feed streams, thereby allowing an ideal solution to the problem of heat removal.

The nature of the polymerization initiators, polymerization activators and other auxiliaries used, such as molecular weight regulators, for example, causes relatively little problem; that is, initiators employed are the customary free-radical donors, such as hydrogen peroxide, sodium peroxodisulfate, potassium peroxodisulfate or ammonium peroxodisulfate, tert-butyl hydroperoxide, dibenzoyl peroxide, sodium peroxide, 2,2'-azobis(2-amidinopropane) dihydrochloride, azobis(isobutyronitrile) and others. Where redox systems are employed, abovementioned initiators are combined with activators that have a reducing effect. Examples of such reducing agents are Fe(II) salts, sodium hydroxymethanesulfinate dihydrate, alkali metal sulfites and metabisulfites, sodium hypophosphite, hydroxylamine hydrochloride, thiourea and others.

One particular advantage of the copolymers is that they can be prepared even without solvents, which can be done using the customary free-radical initiators at temperatures between about 60 and about 150° C. This version may be employed on economic grounds, particularly when the copolymers are to be passed on for use directly in water-free form, since in that case it is possible to dispense with costly and inconvenient separation of the organic solvent or else of the water for a possible polymer-analogous reaction.

The copolymers used in accordance with the invention are particularly advantageous for preparing aqueous and solvent-free pigment preparations which exhibit good pigment incorporation, advantageous rheology profiles, prevention of sedimentation, high color strength, high homogeneity and flocculation stability in the case of pigment mixtures, high degrees of gloss, high hiding power (or, if desired, high transparency) and also particularly outstanding storage stability of the aqueous formulations, and weathering stability.

Aqueous pigment pastes are prepared using in particular from about 0.1 to about 200% by weight of the copolymers, preferably from about 0.5 to about 50% by weight (based on the weight of the pigments). The copolymers may either be mixed beforehand with the pigments to be dispersed or may be dissolved directly in the dispersion medium (water, with or without additions of glycol ethers) prior to or simultaneously with the addition of the pigments and any other solids.

The present invention further provides a process for preparing aqueous, highly concentrated, pumpable and flowable pigment preparations which comprises mixing the styrene-oxide-based polymer for use in accordance with the invention, alone or in combination with at least one further component, with water, scattering the pigment into this mixture with stirring, and dispersing the mixture until the resulting suspension has the desired fineness and consistency. Another process for preparing the pigment preparations of the invention comprises first dry mixing a pigment with the copolymers of the invention to give a pulverulent pigment preparation. As and when required, this formulation may be dispersed in water to give the pigment preparation of the invention. A third process of the invention for preparing aqueous, highly concentrated, pumpable and flowable pigment suspensions and pigment pastes comprises adding the copolymer to a water-moist pigment filtercake and incorporating it into the pigment filtercake using, for example, a dissolver, in the course of which the filtercake undergoes liquefaction Examples that may be mentioned of pigments to be dispersed include the following:

| | |
|---|---|
| Monoazo pigments: | C.I. Pigment Brown 25; |
| | C.I. Pigment Orange 5, 36 and 67; |
| | C.I. Pigment Red 1, 2, 3, 48:4, 49, 52:2, 53, 57:1, 251, 112, 170 and 184; |
| | Solintor WF 57, Lithol Rubine 4 BA 57:1; |
| | C.I. Pigment Yellow 1, 3, 73, 74, 65, 97, 151 and 183; |
| Disazo pigments: | C.I. Pigment Orange 34; |
| | C.I. Pigment Red 144 and 166 |
| | C.I. Pigment Yellow 12, 13, 17, 83, 113 and 126; |
| Anthraquinone pigments: | C.I. Pigment Yellow 147 and 177; |
| | C.I. Pigment Violet 31; |
| Anthrapyrimidine pigments: | C.I. Pigment Yellow 108; |
| Quinacridone pigments: | C.I. Pigment Red 122, 202 and 20; |
| | C.I. Pigment Violet 19; |
| Quinophthalone pigments: | C.I. Pigment Yellow 138; |
| Dioxazine pigments: | C.I. Pigment Violet 23 and 27; |
| Flavanthrone pigments: | C.I. Pigment Yellow 24; |
| Indanthrone pigments: | C.I. Pigment Blue 60 and 64; |
| Isoindoline pigments: | C.I. Pigment Orange 69; |
| | C.I. Pigment Red 260; |
| | C.I. Pigment Yellow 139; |
| Isoindolinone pigments: | C.I. Pigment Orange 61; |
| | C.I. Pigment Red 257 and 260; |
| | C.I. Pigment Yellow 109, 110, 173 and 185; |
| Metal complex pigments: | C.I. Pigment Yellow 117 and 153; |
| Perinone pigments: | C.I. Pigment Orange 43; |
| | C.I. Pigment Red 194; |
| Perylene pigments: | C.I. Pigment Black 31 and 32; |
| | C.I. Pigment Red 123, 149, 178, 179, |

-continued

| | |
|---|---|
| | 190 and 224; |
| | C.I. Pigment Violet 29; |
| Phthalocyanine pigments: | C.I. Pigment Blue 15, 15:1, 15:2, 15:3, 15:4, 15:6 and 16; |
| | C.I. Pigment Green 7 and 36; |
| Pyranthrone pigments: | C.I. Pigment Orange 51; |
| | C.I. Pigment Red 216; |
| Thioindigo pigments: | C.I. Pigment Red 88; |
| Triphenylmethane pigments: | C.I. Pigment Blue 1, 61, and 62; |
| | C.I. Pigment Green 1; |
| | C.I. Pigment Red 81 and 169; |
| | C.I. Pigment Violet 2 and 3; |
| C.I. Pigment Black 1 (aniline black) | |
| C.I. Pigment Yellow 101 (aldazine yellow) | |
| Inorganic pigments: | |
| White pigments: | Titanium dioxide (C.I. Pigment White 6), zinc white, pigment-grade zinc oxide; zinc sulfide, lithopones; lead white; |
| Black pigments: | Black iron oxide (C.I. Pigment Black 11), iron manganese black, spinel black (C.I. Pigment Black 27); carbon black (C.I. Pigment Black 7); |
| Chromatic pigments: | Chromium oxide, chromium oxide hydrate green; chromium green (C.I. Pigment Green 48); cobalt green (C.I. Pigment Green 50); ultramarine green; cobalt blue (C.I. Pigment Blue 28 and 36); ultramarine blue; iron blue (C.I. Pigment Blue 27); manganese blue; ultramarine violet; cobalt and manganese violet; red iron oxide (C.I. Pigment Red 101); cadmium sulfoselenide (C.I. Pigment Red 108); molybdate red (C.I. Pigment Red 104); ultramarine red; brown iron oxide, mixed brown spinel and corundum phases (C.I. Pigment Brown 24, 29 and 31), chromium orange; yellow iron oxide (C.I. Pigment Yellow 42); nickel titanium yellow (C.I. Pigment Yellow 53; C.I. Pigment Yellow 157 and 164); chromium titanium yellow, cadmium sulfide and cadmium zinc sulfide (C.I. Pigment Yellow 37 and 35); chromium yellow (C.I. Pigment Yellow 34), zinc yellow, alkaline earth metal chromates, Naples yellow, bismuth vanadate (C.I. Pigment Yellow 184); |
| Luster pigments: | metallic pigments based on metal-oxide-coated metal flakes; pearlescent pigments based on metal-oxide-coated mica platelets. |

The compounds of the invention are suitable, moreover, particularly for preparing aqueous carbon black pastes. Additionally even what are called "problematic" organic pigments can be successfully dispersed. By problematic pigments are meant, for example, those whose surface has been hydrophobicized, such as, for example, by abietic acid resins, rosins, polyesters, etc. (diarylide yellow pigments); organic/inorganic mixed pigments such as Solintor® WF 57 and lithol rubine 4 BA, for example.

Fillers which can be dispersed, for example, in aqueous coating materials are for example those based on kaolin, talc, other silicates, chalk glass fibers, glass beads or metal powders.

Suitable coating systems into which the pigment preparations of the invention can be let down are any desired aqueous one-component (1K) or two-component (2K) coating materials. By way of example mention may be made of aqueous 1K coating materials, such as, for example, those based on alkyd, acrylate, epoxy, polyvinyl acetate, polyester or polyurethane resins, or aqueous 2K coating materials, examples being those based on hydroxyl-containing polyacrylate or polyester resins with melamine resins or optionally blocked polyisocyanate resins as crosslinkers. In the same way mention may also be made of polyepoxy resin systems.

Furthermore, the dispersants claimed in accordance with the invention, after use for preparing pigment pastes, can be let down with the entire spectrum of dispersion-based binders, such as all-acrylic dispersions, styrene-acrylic dispersions, alkyd resin emulsions and PU-modified versions, terpolymers based on polyvinyl acetate, and hybrid dispersions (e.g., alkyd-acrylate blends).

Water is the preferred solvent for the copolymers to be used in accordance with the invention. However, organic solvents as well, such as glycol ethers or glycol esters, for example, can be used, alone or in a mixture with water. For the initial drying behavior of the pigment pastes prepared by means of the copolymers of the invention, in particular, the addition of solvents may be advantageous.

To prepare the pigment pastes of the invention it is also possible, furthermore, to add additional water-dispersible polymers not in accordance with the invention, such as polyacrylate, polyurethane or polysiloxane derivatives, for example.

When preparing the pigment concentrates of the invention it is additionally possible to use further auxiliaries such as defoamers, preservatives, wetting agents, devotalizes or prior art antisettling agents, waxes or rheological additives.

EXAMPLES

This invention is illustrated by the following non-limiting examples.

Examples

TABLE I

Inventive examples

| No. | Amount Comp. 1/mol % | Comp. 1 | Amount Comp. 2/mol % | Comp. 2 | Amount Comp. 3/mol % | Comp. 3 |
|---|---|---|---|---|---|---|
| D 1 | 50 | Polyethylene (75%)/styrene (25%) glycol monoallyl ether (MW 1100) | 50 | Maleic anhydride | | |
| D 2 | 50 | Polyethylene (75%)/styrene (25%) glycol monovinyl ether (MW 1100) | 50 | Monobutyl maleate | — | — |
| D 3 | 25 | Polyethylene (75%)/styrene (25%) glycol monoallyl ether (MW 1100) | 75 | MA | — | — |

TABLE I-continued

Inventive examples

| No. | Amount Comp. 1/mol % | Comp. 1 | Amount Comp. 2/mol % | Comp. 2 | Amount Comp. 3/mol % | Comp. 3 |
|---|---|---|---|---|---|---|
| D 4 | 25 | Polyethylene (75%)/styrene (25%) glycol monoallyl ether (MW 1100) | 37.5 | DIMAPA | 37.5 | MA |
| D 5 | 25 | Polyethylene (75%)/styrene (25%) glycol monoallyl ether (MW 1100) | 73 | MA | 2 | Polypropylene glycol bis-maleamic acid (MW 1000) |

MA = Methyl acrylate
DIMAPA = Dimethylaminopropylacrylamide

TABLE II

Noninventive, comparative examples

| No. | Amount Comp. 1/mol % | Comp. 1 | Amount Comp. 2/mol % | Comp. 2 | Amount Comp. 3/mol % | Comp. 3 |
|---|---|---|---|---|---|---|
| V 1 | 50 | Polyethylene (75%)/propylene (25%) glycol monovinyl ether (MW 1100) | 50 | Maleic anhydride | — | — |
| V 2 | 50 | Polyethylene (75%)/propylene (25%) glycol monovinyl ether (MW 1100) | 50 | Monobutyl maleate | — | — |
| V 3 | 25 | Polyethylene (75%)/propylene (25%) glycol monoallyl ether (MW 1100) | 75 | MA | — | — |
| V 4 | 25 | Polyethylene glycol monovinyl ether (MW 1100) | 37.5 | DIMAPA | 37.5 | MA |
| V 5 | 25 | Polyethylene (75%)/propylene (25%) glycol monoallyl ether (MW 1100) | 73 | MA | 2 | Polypropylene glycol bis-maleamic acid (MW 1000) |

MA = Methyl acrylate
DIMAPA = Dimethylaminopropylacrylamide

Preparation Example for D1

A reaction vessel with thermometer, stirrer, reflux condenser and two ports for separate feeds was charged with 270 g of water. With stirring, 32.7 g of maleic anhydride and 25.0 g of 50% strength aqueous sodium hydroxide solution were added, the temperature being held below 30° C. by cooling. Subsequently 100 mg of iron sulfate heptahydrate and 18.5 g of 30% strength hydrogen peroxide were added with stirring and, from separate feed vessels, a solution of 5.1 g of sodium hydroxymethanesulfinate dihydrate and 12.5 g of water (feed stream 1) was added, over the course of 75 minutes, and a solution of 155 g of poly(ethylene glycol-b-styrene oxide) monovinyl ether was added.

After the end of the addition stirring was continued at 35° C. for 30 minutes and the reaction mixture was cooled to 25° C. 20% strength aqueous sodium hydroxide solution was added to set a pH of 7.6. A yellow-colored, slightly turbid aqueous formulation was obtained which had a solids content of 37.4% by weight.

Examples D2, C1 and C2 were prepared analogously using the monomer units and parts by weight indicated in Tables I and II.

Preparation Example, D3

A reaction vessel with thermometer, stirrer, reflux condenser and two ports for separate feeds was charged with 192 g of poly(ethylene glycol-b-styrene oxide) monoallyl ether and this initial charge was heated to 100° C. With stirring, separately, 47.7 g of methyl acrylate and 3.6 g of AMBN (2,2'-azobis(2-methylbutyronitrile)) were added over the course of 2 hours, the temperature being held at 100° C. A post-polymerization time of 2 hours was employed. A slightly yellowish-colored product, in 100% form, was obtained.

Examples D4, D5, C3, C4 and C5 were prepared analogously.

The inventive examples are identified in Table 1, the examples given not constituting any restriction of the patent claims but instead serving merely for illustration. In Table II the noninventive, comparative examples are identified The aforementioned compounds of the invention are used for preparing pigment pastes which are used in turn to color a variety of coating materials.

The compounds of the invention on which the patent is based, like the noninventive compounds as well, were brought to a readily meterable concentration of 40% polymer in $H_2O$, for ease for comparison and incorporation, and the solutions were subsequently adjusted to a pH of 8.0 using amine.

The compounds of the invention can be used as wetting and dispersing additives particularly for binder-free pigment pastes but also for pigment pastes containing binder.

Aqueous pigment formulations can customarily comprise:

| | |
|---|---|
| 0.5 to 50 pbw | of at least one of the compounds of the invention, |
| 0 to 20 pbw | of dispersing resin, |
| 5 to 80 pbw | of pigment, |

| | |
|---|---|
| 0.1 to 5 pbw | of customary auxiliaries and additives (defoamers, biocides, antisettling agents, neutralizing agents, thickeners, humectants, stabilizers, siccatives, light stabilizers) |
| 0 to 30 pbw | of solvent |
| ad 100 pbw | water. |

They can also be let down with up to 1000 times the pbw of varnish or introduced into a white varnish for shade correction (tinting).

In aqueous paste systems the choice of the wetting and dispersing additive is dependent on the pigment used and on the coating system in which the paste is processed. Additionally there are not only solvent-free pastes but also pastes containing glycol.

Naturally additives in the coating film must not lead to clouding or a loss of gloss.

The solubility of the additive in a highly concentrated binder solution is often employed as a criterion for the compatibility. Slight clouding of the additive in the binder, however, may be attributable to the anchor groups or may even signal the tendency of the additive to migrate with the hydrophobic fraction from the aqueous environment to a hydrophobic pigment surface, so that in practice in the pigmented coating material it is nevertheless possible to obtain high-gloss coatings free from clouding.

Customarily, to gain an overview, the skilled worker conducts the following tests: to 50 g of binder solution there are added 1 g, 5 g or 10 g of dispersant, taking into account the different dispersant demand of oxide and organic pigments, and the tendency toward clouding or else coagulation (in the case of dispersions, for example) is observed in a glass. This quality can be quantified by subsequent application to transparent film and calorimetric measurement using a standardized black panel.

Rub-Out Test:

In order to make visible and measureable the vertical floating, in particular, of pigments in coating films, the test known as the rub-out test can be carried out. For this test the paint film, while still wet though having already taken, is rubbed with the finger or a brush. If the pigments have separated or are in a highly flocculated state, the mechanical operation of rubbing reestablishes a homogeneous distribution. The target shade of the homogeneous mixture is produced. From the difference in color relative to the unrubbed film the extent of the disruption is apparent. The rubout effect obtained can be either positive or negative. A positive rub-out effect means that the color strength of the unrubbed film is lower than that of the rubbed film, possibly attributable to the floating of white pigment, for example. The opposite situation produces a negative rub-out effect.

Sagging Test:

Deflocculating or weakly flocculating additives are suitably evaluated by means of a sagging test or drawdown on a transparent film. The quality of different dispersing additives can be evaluated with criteria such as gloss, gloss haze and possibly transparency.

Storage Stability:

A 100 ml sample of each of the pigment pastes prepared is placed in a glass bottle and the formation of sediment and clear serum is assessed on unstirred samples after 1, 3 and 6 months. After the corresponding period of time at rest the paste is inspected and the amount of clear serum over the paste is reported in millimeters. A spatula is drawn carefully over the bottom of the paste and the remaining quantity of sediment is reported as "none, little or much".

Viscosity Determination:

As well as the coloristic parameters, determination of the viscosity of the resultant pigment pastes is an important criterion for assessing the wetting of the corresponding pigment surface. For such determination a variety of kinds of viscometers are used. Moreover, the constancy of the viscosity after 1,3 and 6 months may serve to typify the permanence of the interaction between pigment and dispersant and so guarantee the storage stability of the pastes.

Customary viscosity profiles which are measured are, for example, from 100 to 1000 mPas in steps of 100 mPas in 180 s or from 100 to 1000 mPas with a pause at 100 mPas (held for 60 s) with increasement by 100 mPas to 1000 mPas (held for 60 s) and back to 100 mPas. Various viscometers are employed for the measurement, such as Europhysics, RHEO 2000, for example.

Determination of the Colorimetric Values:

The pigmented paints and inks drawn down onto cardboard charts (Leneta® chart) are measured using a colorimeter (X-Rite, SP 62-162, illuminant D65/10, X-Rite) in the form of L*a*b* values (brightness, undertone on the red/green scale, undertone on the yellow/blue scale).

For preparing aqueous pigment pastes, 0.5 to 50.0 parts by weight (pbw) of the neutralized, specially modified copolymers based on vinyl-functionalized and styrene-oxide-based polyethers are used, preferably from 1.0 to 40.0 parts by weight, based on the polymers in 100% form.

If the derivatives resulting, for example, from a bulk polymerization are not in liquid form, it is advisable first to prepare a 40 to 50% strength solution, since in the course of the inventive use of such compounds an initial $H_2O$ charge is used in any case and then the corresponding pigments and fillers are incorporated, this also possibly including additions of glycol-containing solvents at from 0 to 30.0 parts by weight, preferably from 0 to 10.0 parts by weight.

In principle the dispersants claimed in accordance with the invention can also be introduced into the dispersion medium simultaneously with the pigment and/or filler or can be mixed with said medium beforehand. The combined use of the compounds claimed in accordance with the invention with further, known dispersants is naturally included in the scope of this specification, since the skilled worker in any case works in such a way as to achieve specific profiles of properties.

System 1

Formulation of the Color Paste:

| General conditions: | |
|---|---|
| demineralized water | 20.1 |
| dispersing additive, 40% solids as described above | 8.8 |
| defoamer Tego ® Foamex 830 | 1.0 |
| biocide Parmetol ® K 40 (Schülke & Mayr) stir until homogeneous | 0.10 |
| titanium dioxide KRONOS ® 2310 (KRONOS International, Inc.) | 70.0 |

Stir in pigment then disperse for I h with glass beads (1:1 volume/e.g., using shaker type BA-S 20K from Lau GmbH).

System 2:

Formulation of the Color Paste:

| General conditions: | |
| --- | --- |
| demineralized water | 47.8 |
| dispersing additive, 40% solids as described above | 29.7 |
| defoamer Tego ® Foamex 830 | 1.0 |
| biocide Parmetol ® K 40 (Schülke & Mayr) stir until homogeneous | 0.10 |
| carbon black Printex ® 95 (Degussa) | 20.0 |

Stir in pigment then disperse for 2 h with glass beads (1:2 volume/e.g., using shaker type BA-S 20K from Lau GmbH).

System 3:

Formulation of the Color Paste:

| General conditions: | |
| --- | --- |
| demineralized water | 28.9 |
| dispersing additive, 40% solids as described above | 35.0 |
| defoamer Tego ® Foamex 830 | 1.0 |
| biocide Parmetol ® K 40 (Schülke & Mayr) stir until homogeneous | 0.10 |
| phthalocyanine Heliogenblau ® L 7101 F (BASF AG) | 35.0 |

Stir in pigment then disperse for 2 h with glass beads (1:2 volume/e.g., using shaker type BA-S 20K from Lau GmbH).

System 4:

Formulation of the Color Paste:

| General conditions: | |
| --- | --- |
| demineralized water | 13.9 |
| dispersing additive, 40% solids as described above | 19.5 |
| defoamer Tego ® Foamex 830 | 1.0 |
| biocide Parmetol ® K 40 (Schülke & Mayr) stir until homogeneous | 0.10 |
| red iron oxide Bayferrox ® 120 M (Bayer AG) | 65.0 |

Stir in pigment then disperse for 1 h with glass beads (1:1 volume/e.g., using shaker type BA-S 20K from Lau GmbH).

These pastes, prepared on the basis of the inventive and noninventive compounds, and based on system 1, are mixed, in accordance with the full mixing customary in the coatings industry, together with a standard carbon black paste in a varnish based on an acrylate dispersion (NeoCryl® XK 90, Zeneca), in the following proportions: for each 10 g of varnish 3.55 g of $TiO_2$ paste are added and 0.30 g of carbon black paste is mixed in.

These mixtures are subsequently homogenized at 1500 rpm. The vanish I used for this purpose is apparent from the formulation below.

| Formulation of varnish I: | |
| --- | --- |
| thickener Rheolate ® 278 (Rheox) | 5.2 |
| solvent butyl glycol | 4.2 |
| solvent methoxybutanol | 4.5 |
| binder NeoCryl ® XK 90 (NeoResins) | 77.5 |
| demineralized water | 8.6 |
| | 100.0 |

Additionally it is possible to carry out tinting using color pastes resulting from the use of the inventive and noninventive compounds (systems 2, 3 and 4) in a white paint I or a white paint II based on acrylate dispersions, as apparent from the following formulations.

| Formulation of white paint I: | |
| --- | --- |
| solvent propylene glycol | 2.3 |
| demineralized water | 3.0 |
| neutralizing agent AMP-90 ® (Angus) | 0.2 |
| defoamer Tego ® Foamex 805 | 0.2 |
| wetting agent Surfynol ® 104 E (Air Products) | 0.4 |
| dispersing resin NeoCryl ® BT 24 (NeoResins) | 2.9 |
| titanium dioxide KRONOS ® 2310 (KRONOS International, Inc.) | 21.4 |

Disperse for 20 min at 6000 rpm using a Dispermat like that from VMA Getzmann, for example, in a 1000 ml stainless steel pot with a dissolver disk d=60 mm, and then add the following formulating ingredients:

| | |
| --- | --- |
| thickener Rheolate ® 278 (Rheox) | 3.6 |
| solvent butyl glycol | 2.9 |
| solvent methoxybutanol | 3.1 |
| binder NeoCryl ® XK 90 (NeoResins) | 54.0 |
| defoamer Tego ® Foamex 805 | 0.4 |
| demineralized water | 5.6 |
| | 100.0 |

| Formulation of white paint II: | |
| --- | --- |
| solvent propylene glycol | 30.5 |
| demineralized water | 32.5 |
| acrylate-based dispersant, NaOH neutralized (OROTAN ® 731 (25% solution)) | 8.3 |
| defoamer Byk 019 | 2.0 |
| titanium dioxide KRONOS ® 2310 (KRONOS International, Inc.) | 205.0 |

Disperse for 20 min at 6000 rpm using a Dispermat like that from VMA Getzmann, for example, in a 1000 ml stainless steel pot with a dissolver disk d=60 mm, and then add the following formulating ingredients:

| | |
|---|---|
| binder Primal ® HG 98 D (Rohm & Haas) | 590.0 |
| wetting agent Rhodafac ® RS-410 | 4.5 |
| solvent Dowanol DPnB | 21.0 |
| demineralized water | 24.0 |
| thickener Acrysol ® RM 2020 (Rohm & Haas) | 24.0 |
| defoamer Byk 024 | 3.0 |
| demineralized water | 55.2 |
| | 1.000.0 |

Additionally the white pastes based on the inventive and noninventive compounds (system 1) are incorporated into a vanish II based on an alkyd resin dispersion (Uradil® XP5562AZ) in accordance with the formulation below.

| Formulation of varnish II: | |
|---|---|
| demineralized water | 11.45 |
| binder Uradil ® XP 5560 AZ (DSM) | 80.00 |
| thickener Acrysol ® RM 8 (Rohm & Haas) | 1.00 |
| thickener Acrysol ® RM 2020 (Rohm & Haas) | 4.40 |
| siccative Additol ® VXW 4940 (Vianova) | 0.70 |
| wetting agent Tego ® Wet 280 | 0.45 |
| solvent propylene glycol | 2.00 |
| | 100.0 |

Furthermore, the color pastes (systems 2 and 3) based on the invention and noninventive compounds are introduced into a white two-component paint III (acrylate/isocyanate, Bayhydrol® VPLS 2235/1 and Bayhydur® VPLS 2319/80, Bayer A G) in the formulation below.

| Formulation of white paint III: | |
|---|---|
| binder Bayhydrol ® VPLS 2235/1 (Bayer) | 41.00 |
| wetting agent Surfynol ® 104E (Air Products) | 1.00 |
| titanium dioxide KRONOS ® 2310 (KRONOS International, Inc.) | 35.00 |
| binder Bayhydrol ® VPLS 2235/1 (Bayer) | 16.50 |
| thickener Acrysol ® RM 8, 20% strength in EtOH (Rohm & Haas) | 0.60 |
| demineralized water | 5.90 |
| | 100.0 |

The acrylate is crosslinked by mixing 100 parts by weight of white paint with 22 parts by weight of isocyanate component. 10 g of the aforementioned binder/curing agent nix are homogenized with either 0.49 g of carbon black paste (system 2) or 0.28 g of phthalocyanine paste (system 3) (by mixing at 1500 rpm for 5 minutes) and after overnight drying the corresponding parameters are determined.

Results:

Colorimetric Results and Gloss Assessment:

TABLE III

System 3 with white paint I:

| | Brightness L* | a* | b* | Rub-out ΔE | Gloss 20° |
|---|---|---|---|---|---|
| D 1 | 64.69 | −21.74 | −35.00 | 1.67 | 40.2 |
| D 2 | 63.00 | −21.62 | −35.76 | 1.62 | 37.1 |
| D 3 | 61.25 | −21.21 | −36.70 | 1.92 | 36.6 |
| D 4 | 62.59 | −21.42 | −35.92 | 1.49 | 37.4 |
| D 5 | 62.43 | −21.31 | −36.07 | 1.28 | 36.1 |
| C 1 | 79.79 | −15.43 | −18.93 | 14.67 | 18.7 |
| C 2 | 64.80 | −21.61 | −35.14 | 1.45 | 33.6 |
| C 3 | 65.99 | −19.97 | −32.21 | 1.56 | 32.8 |
| C 4 | 73.02 | −16.02 | −22.99 | 12.75 | 18.4 |
| C 5 | 68.57 | −17.35 | −29.67 | 2.87 | 27.3 |

TABLE IV

System 3 with white paint II:

| | Brightness L* | Rub-out ΔE | Gloss 20° |
|---|---|---|---|
| D1 | 64.84 | 0.69 | 54.3 |
| D2 | 64.20 | 0.67 | 56.0 |
| D3 | 64.99 | 0.39 | 53.5 |
| D4 | 64.73 | 0.48 | 48.5 |
| D5 | 64.95 | 0.43 | 49.3 |
| C1 | 69.50 | 8.82 | 18.9 |
| C2 | 65.39 | 0.52 | 46.0 |
| C3 | 67.00 | 2.66 | 45.5 |
| C4 | 79.43 | 16.04 | 19.3 |
| C5 | 71.18 | 3.64 | 40.1 |

In white paint II as well, through the use of the compounds of the invention for preparing phthalocyanine pastes, tintings are possible which make clear the efficiency as compared with the noninventive compounds on the basis of color depth development and low rub-outs. It is particularly worth emphasizing that the compounds of the invention allow the preparation of high-gloss coating materials based on acrylate dispersions.

TABLE V

System 2 in white paint II:

| | Brightness L* | a* | b* | Rub-out ΔE | Gloss 20° |
|---|---|---|---|---|---|
| D 1 | 49.52 | −0.72 | −2.52 | 0.27 | 58.9 |
| D 2 | 48.76 | −0.75 | −2.43 | 0.45 | 60.6 |
| D 4 | 49.62 | −0.73 | −2.37 | 0.04 | 60.1 |
| C 1 | 66.62 | −1.70 | −6.08 | 12.69 | 39.9 |
| C 2 | 52.88 | −0.78 | −2.37 | 0.82 | 55.3 |
| C 4 | 65.54 | −1.63 | −6.02 | 14.77 | 48.0 |

TABLE VI

System 4 in white paint II:

| | Brightness L* | a* | b* | Rub-out ΔE |
|---|---|---|---|---|
| D3 | 63.37 | 22.53 | 10.24 | 0.38 |
| D4 | 63.00 | 22.82 | 10.53 | 0.36 |

TABLE VI-continued

System 4 in white paint II:

| | Brightness L* | a* | b* | Rub-out ΔE |
|---|---|---|---|---|
| C3 | 64.44 | 22.03 | 9.63 | 0.63 |
| C4 | 64.33 | 21.83 | 9.27 | 0.49 |

TABLE VII

System 1 in varnish II:

| | 20° Gloss | 60° Gloss |
|---|---|---|
| D2 | 82.4 | 93.7 |
| D3 | 85.3 | 93.9 |
| C2 | 80.3 | 91.7 |
| C3 | 79.7 | 91.2 |

The compounds of the invention, when titanium dioxide pastes based on them are incorporated into a high-gloss acrylic varnish, exhibit an outstanding compatibility, which is manifested in high degrees of gloss of the resultant white alkyd resin paint. This means that the compounds of the invention tolerate a high level of fineness in the white pigment, of $\leq 10$ μm.

TABLE VIII

System 2 in white paint III:

| | Brightness L* | a* | b* | Rub-out ΔE |
|---|---|---|---|---|
| D1 | 52.57 | −0.75 | −2.47 | 0.48 |
| D2 | 53.17 | −0.77 | −2.46 | 0.37 |
| D3 | 51.37 | −0.73 | −2.43 | 0.28 |
| D4 | 53.05 | −0.77 | −2.34 | 0.26 |
| D5 | 52.72 | −0.71 | −2.39 | 0.40 |
| C1 | 61.02 | −1.08 | −3.41 | 5.08 |
| C2 | 55.16 | −0.76 | −2.35 | 1.09 |
| C3 | 54.09 | −0.78 | −2.58 | 0.63 |
| C4 | 66.17 | −1.59 | −5.98 | 14.77 |
| C5 | 57.29 | −0.89 | −3.72 | 2.45 |

The compounds of the invention allow the preparation of carbon black pastes which when incorporated into the 2K PUR white paint are distinguished by high development of color depth with very low rub-out values.

TABLE IX

System 3 in white paint III:

| | Brightness L* | a* | b* | Rub-out ΔE |
|---|---|---|---|---|
| D1 | 67.09 | −22.04 | −33.66 | 0.99 |
| D2 | 66.06 | −22.22 | −34.28 | 0.27 |
| D3 | 66.59 | −22.08 | −34.02 | 0.87 |
| D4 | 67.06 | −21.81 | −33.18 | 0.78 |
| D5 | 66.89 | −21.93 | −33.89 | 0.52 |
| C1 | 83.96 | −10.82 | −13.32 | 1.85 |
| C2 | 67.82 | −20.99 | −30.42 | 0.87 |
| C3 | 69.02 | −20.17 | −30.75 | 3.50 |
| C4 | 81.58 | −12.16 | −15.84 | 2.26 |
| C5 | 71.29 | −18.77 | −29.51 | 2.08 |

Summary

The comparisons above characterize the compounds of the invention with styrene oxide as an essential structural constituent in the polyether units of the polymers, with reference to D1 to D5 by way of example (but not exclusively restricted thereto), with regard to their universal applicability to a variety of pigment surfaces (organic pigments, carbon blacks and oxidic, inorganic pigments). Particular advantage attaches here to the use of polymelabe, in other words, for example, vinyl-functional or allyl-functional, polyethers in combination with dicarboxylic acid derivatives, such as with monobutyl maleate, for example, in an aqueous polymerization. Additionally it is possible for above-described polymerizable, styrene-oxide-based polyoxyalkylenes, even in solvent-free bulk polymerization using monomers with acrylic functionality such as methacrylate, for example, or, with particular preference, using amino-functional acrylate units such as DIMAPA, for example, to give extremely effective, gloss-stabilizing dispersants and wetting agents.

The above description of the invention is intended to be illustrative and not limiting. Various changes or modifications in the embodiments described herein may occur to those skilled in the art These changes can be made without departing from the scope or spirit of the invention.

What is claimed is:

1. A method for dispersing a preparation comprising solid components which is a coating paint, printing ink, or aqueous or co-solvent containing pigment concentrate which comprises adding at least one dispersing additive comprising copolymers composed of A) from about 1 to about 80 mol % of styrene-oxide based oxyalkylene glycol ethers or polyalkylene oxide ethers which comprise of one structural group of the formula Ia, Ib, Ic and/or Id

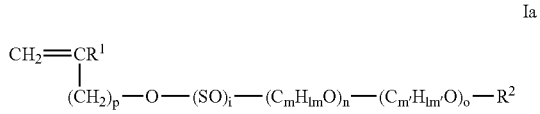

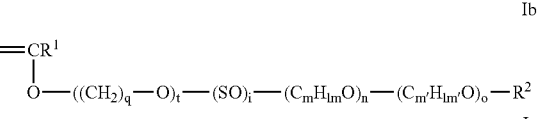

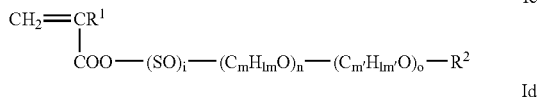

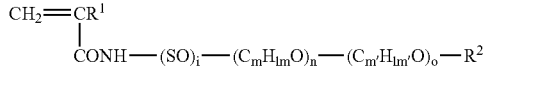

where
$R^1$=H or an aliphatic hydrocarbon radical,
p=1 to 4,
q=0 to 6,
t=0 to 4,
i=1 to 6,
l=2 or is 1 in the situation where $(C_mH_{lm}O)_n$ or $(C_mH_{lm'})o$ is SO,
m=2 to 18,
m'=2 to 18,
the index on the H atom being formed by the product of l and m,
n=0 to 100,
o=0 to 100,
SO=styrene oxide where
(SO)$_i$ and the alkylene oxide derivatives can be distributed randomly or blockwise in the polyether, R$^2$=H, an aliphatic, linear or branched hydrocarbon radical having 1 to 6 carbon atoms, a cycloaliphatic hydrocarbon having 5 to 8 carbon atoms an aryl radical having 6 to 14 carbon atoms, phosphoric ester or a monophosphate ester;

B) from about 1 to about 90 mol % of unsaturated carboxylic acid and/or dicarboxylic acid derivatives comprising at least one structural group of the formula II

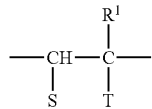

II where
S=—H, —COOM$_a$, or —COOR$^3$,
where
M=hydrogen, monovalent or divalent metal cation, ammonium ion, or organic amine radical,
a=1 or, if M is a divalent metal cation, is ½,
R$^3$=an aliphatic, linear or branched hydrocarbon radical, a cycloaliphatic hydrocarbon, or an aryl radical,
T=—U$^1$—R$^4$ or —U$^1$—(C$_m$H$_{lm}$O)$_n$—(C$_m$H$_{lm}$O)$_o$—R$^2$,
where
U$^1$=—COO—, —CONH—, —CONR$^3$—, —O—, or —CH$_2$O—,
R$^4$=H, M$_a$, R$^3$ or —Q$^1$—NQ$^2$Q$^3$,
where
Q$^1$ is a divalent alkylene radical having 2 to 24 carbon atoms,
Q$^2$ and Q$^3$— are aliphatic and/or alicyclic alkyl radicals having 1 to 12 carbon atoms, optionally oxidized to —Q$^1$—N(+)O(−)Q$^2$Q$^3$
and
m, m', n, l, o, R$^1$ and R$^2$ are as defined above; and
C) from 0 to about 10 mol % of dicarboxylic acid derivatives comprising at least one structural group of the formula III

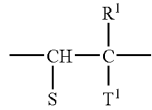

III where
T$^1$=—U$^1$—(C$_m$H$_{lm}$O)$_n$—(C$_m$H$_{lm}$O)$_o$—R$^5$,
where

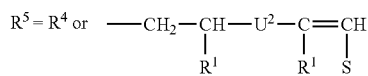

where
U$^2$=—OOC—, —NHOC—, —O—, or —O—CH$_2$—,
where
m, m', n, l, o, S, R$^1$, R$^2$ and U$^1$ are as defined above.

2. The method according to claim 1, wherein the copolymer comprises

A) from 1 to 80 mol % of styrene-oxide based oxyalkylene glycol ethers or polyalkylene oxide ethers which comprise at least one structural group of the formula Ia, Ib, Ic and/or Id

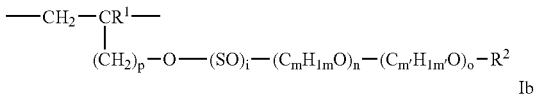

Ib

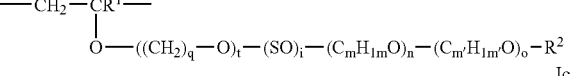

Ic

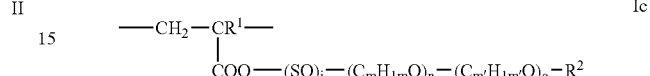

Id

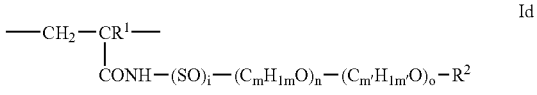

where
R$^1$=H, or an aliphatic hydrocarbon radical having 1 to 5 carbon atoms,
p=1 to 4,
q=0 to 6,
t=0 to 4,
i=1 to 6,
l=2 or is 1 in the situation where (C$_m$H$_{lm}$O)$_n$ or (C$_m$H$_{lm}$O)$_o$ is SO,
m=2 to 18,
m'=2 to 18,
the index on the H atom being formed by the product of l and m or l and m,
n=0 to 100,
o=0 to 100, and the sum of (n+o)>0
SO=styrene oxide
where
(SO)$_i$ and the alkylene oxide derivatives can be distributed randomly or blockwise in the polyether, R$^2$=H, an aliphatic, linear or branched hydrocarbon radical having 1 to 6 carbon atoms, a cycloaliphatic hydrocarbon having 5 to 8 carbon atoms, an aryl radical having 6 to 14 carbon atoms, phosphoric ester or a monophosphate ester;

B) from 1 to 90 mol % of unsaturated carboxylic acid and/or dicarboxylic acid derivatives which comprise at least one structural group of the formula II

II where
S=—H, —COOM$_a$, or —COOR$^3$,
where
M=hydrogen, monovalent or divalent metal cation, ammonium ion, or an organic amine radical,
a=1 or, if M is a divalent metal cation, is ½,
R$^3$=an aliphatic, linear or branched hydrocarbon radical having 1 to 20 carbon atoms, a cycloaliphatic hydrocarbon having 5 to 8 carbon atoms, or an aryl radical having 6 to 14 carbon atoms, T=—U¹—R⁴ or —U¹—(C_mH_lmO)_n—(C_mH_lmO)_o—R²,
where
U¹=—COO—, —CONH—, —CONR³—, —O—, or —CH₂O—,
R⁴=H, M_a, R³ or -Q¹-NQ²Q³,
where
Q¹ is a divalent alkylene radical having 2 to 24 carbon atoms,
Q² and Q³—are aliphatic and/or alicyclic alkyl radicals having 1 to 12 carbon atoms, optionally oxidized to —Q¹—N(+)O(−)Q²Q³
and
m, m', n, l, o, R¹ and R² are as defined above; and
C) from 0 to about 10 mol % of dicarboxylic acid derivatives which comprise at least one structural group of the formula III

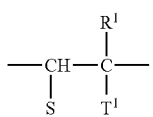

III where
T¹=—U¹—(C_mH_lmO)_n—(C_mH_lmO)_o—R⁵,
where

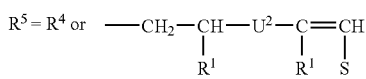

where
U²=—OOC—, —NHOC—, —O—, or —O—CH₂—,
where
m, m', n, l, o, S, R¹, R² and U¹ are as defined above.

3. The method according to claim 1, wherein (SO); and the alkylene oxide derivatives are distributed blockwise in the following order —(SO)_i—[(C_mH_lmO)_n—(C_mH_lmO)_o]—R².

4. The method according to claim 2, wherein R² is H.

5. The method according to claim 1, wherein R² is a phosphoric mono ester derivative.

6. The method according to claim 1, wherein up to 50 mol %, based upon the sum of structured groups A), B) and C), whose monomers are derived from vinyl, acrylic acid or methacrylic acid.

7. The method according to claim 1, wherein up to 20 mol %, based upon the sum of structural groups A), B) and C) whose monomers are derived from vinyl, acrylic acid or methacrylic acid.

8. The method according to claim 1, wherein the formulation is an aqueous or co-solvent containing pigment concentrate and the additive is present in amounts of from about 0.1 to 200% by weight, based upon the amount of pigment.

9. The method according to claim 1, wherein the copolymers in the dispersing additive are composed of from about 10 to about 60 mol % of the structural group Ia, Ib, Ic and/or Ic, from about 40 to 90 mol % of the structural groups of formula II and from 0 to about 2 mol % of the structural groups of formula III.

10. The method according to claim 1, wherein some of the structural groups of the formula II are dicarboxylic acid derivatives that contain amino oxide groups.

11. The method according to claim 1, wherein some of the structural groups of the formula II are dicarboxylic acid derivatives containing alkyl alcohol or alkylamine groups.

12. The method according to claim 1, wherein the copolymers are obtained by polymerizing the monomers in an aqueous solution that contains aqueous solvents at a temperature from about 20 to about 100° C.

13. The method according to claim 1, wherein the formulation is a paint, printing ink or pigment concentrate which comprises pigments that are organic pigments.

14. The method according to claim 13, wherein the organic pigments have been modified means of high resin fractions.

15. The method according to claim 13, wherein the organic pigments are carbon black.

16. The method according the claim 1, wherein the formulation is a paint, printing ink or pigment concentrate which comprises pigments that are inorganic pigments.

17. The method according to claim 16, wherein the pigments are iron oxide.

18. A pigment-containing preparation comprising at least one pigment and from about 0.1 to about 200% by weight, based upon the pigment, of at least one dispersion additive comprising copolymers composed of
A) from about 1 to about 80 mol % of styrene-oxide based oxyalkylene glycol ethers or polyalkylene oxide ethers which comprise of one structural group of the formula Ia, Ib, Ic and/or Id

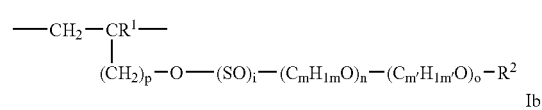

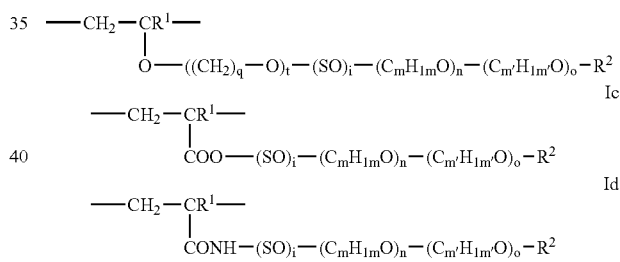

where
R¹=H or an aliphatic hydrocarbon radical,
p=1 to 4,
q=0 to 6,
t=0 to 4,
i=1 to 6,
l=2 or is 1 in the situation where (C_mH_lmO)_n or (C_m'H_lm'O)_o is SO,
m=2 to 18,
m'=2 to 18,
the index on the H atom being formed by the product of l and m or l and m',
n=0 to 100
o=0 to 100,
SO=styrene oxide
where
(SO)_i and the alkylene oxide derivatives can be distributed randomly or blockwise in the polyether,
R²=H, an aliphatic, linear or branched hydrocarbon radical having 1 to 6 carbon atoms,, a cycloaliphatic hydrocarbon having 5 to 8 carbon atoms, an aryl radical having 6 to 14 carbon atoms, phosphoric ester or a monophosphate ester;

B) from about 1 to about 90 mol % of unsaturated carboxylic acid and/or dicarboxylic acid derivatives comprising at least one structural group of the formula II

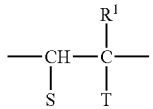
II where
$S$=—H, —COOM$_a$, or —COOR$^3$,
where
  M=hydrogen, monovalent or divalent metal cation, ammonium ion, or an organic amine radical,
  a=1 or, if M is a divalent metal cation, is ½,
  R$^3$=an aliphatic, linear or branched hydrocarbon radical, a cycloaliphatic hydrocarbon, or an aryl radical,
  T=—U$^1$—R$^4$ or —U$^1$—(C$_m$H$_{lm}$O)$_n$—(C$_m$H$_{lm}$O)$_o$—R$^2$,
  where
    U$^1$=—COO—, —CONH—, —CONR$^3$—, —O—, or —CH$_2$O—,
    R$^4$=H, M$_a$, R$^3$ or -Q$^1$-NQ$^2$Q$^3$,
    where
      Q$^1$ is a divalent alkylene radical having 2 to 24 carbon atoms,
      Q$^2$ and Q$^3$ —are aliphatic and/or alicyclic alkyl radicals having 1 to 12 carbon atoms, optionally oxidized to —Q$^1$—N(+)O(−)Q$^2$Q$^3$
  and
    m, m', n, l, o, R$^1$ and R$^2$ are as defined above; and C) from 0 to about 10 mol % of dicarboxylic acid derivatives comprising at least one structural group of the formula III

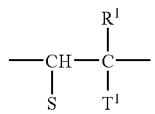
III where
  T$^1$=—U$^1$—(C$_m$H$_{lm}$O)$_n$—(C$_m$'H$_{lm}$'O)$_o$—R$^5$,
  where R$^5$ = R$^4$ or —CH$_2$—CH(R$^1$)—U$^2$—C(R$^1$)=CH(S)

where
  U$^2$=—OOC—, —NHOC—, —O—, or —O—CH$_2$—,
where
  m, m', n, l, o, S, R$^1$, R$^2$ and U$^1$ are as defined above.

19. The pigment-containing preparation according to claim 18, wherein the pigment-containing preparation is an aqueous pigment paste.

20. The pigment-containing preparation according to claim 18, wherein the pigment-containing preparation is an aqueous pigment paste.

21. The aqueous pigment paste according to claim 20, wherein the pigment is carbon black.

22. The pigment-containing preparation according to claim 18 wherein the pigment-containing preparation is solvent free.

23. The pigment-containing preparation according to claim 18 wherein the pigment-containing preparation is a paint or a printing ink.

24. The pigment-containing preparation according to claim 18, wherein the pigment-containing preparation is a pigment concentrate.

\* \* \* \* \*